*INVENTOR.*
GERALD J. MILLS

BY

ATTORNEY

INVENTOR.
GERALD J. MILLS

BY [signature]

ATTORNEY

INVENTOR.
GERALD J. MILLS
BY [signature]
ATTORNEY

Jan. 1, 1963 G. J. MILLS 3,071,317

TAPE PROGRAM APPARATUS

Filed Sept. 22, 1960

7 Sheets-Sheet 4

INVENTOR.
GERALD J. MILLS

BY Orel R. Goshaw

ATTORNEY

INVENTOR.
GERALD J. MILLS
BY
ATTORNEY

Jan. 1, 1963 G. J. MILLS 3,071,317

TAPE PROGRAM APPARATUS

Filed Sept. 22, 1960 7 Sheets-Sheet 6

INVENTOR.
GERALD J. MILLS

BY [signature]

ATTORNEY

INVENTOR.
GERALD J. MILLS

BY Orl R. Godwin

ATTORNEY

3,071,317
TAPE PROGRAM APPARATUS

Gerald J. Mills, Beverly Hills, Calif., assignor to Chalco Engineering Corporation, Gardena, Calif., a corporation of California Filed Sept. 22, 1960, Ser. No. 57,832
12 Claims. (Cl. 234—79)

This invention relates to tape control programming apparatus, and particularly to equipment for perforating tape to control a predetermined series of checks or operations, the equipment including a combined manual punching and repeater unit for duplicating a certain prepunched tape and a high quality readout unit.

The use of perforated tape for providing a predetermined series of electrical contacts for purposes of controlling other functions is known, the present invention being directed to tape programming equipment which has the maximum of reliability in performance. The original punching of a tape is accomplished manually, while duplication of the original punching is accomplished automatically. The readout unit embodies novel electrical contact elements and is, therefore, particularly reliable in operation.

Within any one frame of the tape, up to 132 control contact perforations are possible, these being produced by the simple manual actuation of eleven key switches. After the tape has been manually punched by one portion of the duplicating unit, this tape may be inserted in the other portion of this unit and a second duplicate copy rapidly produced if desired.

The readout unit is separate and is provided with a novel reversing mechanism which permits any frame to be repeated at will and which may be done rapidly without failure. Special contacts have been provided which are self-cleaning and others of which are not subject to contamination by film surface dirt or other accumulations, which, in many systems, interfere with the making of the electrical contacts.

Several features are incorporated in the equipment to increase its reliability, such as special tape transport control circuits and the special type of electrical contacts. To reduce the over-all size of the equipment, the punch units are positioned within a minimum of space.

The principal object of the invention, therefore is to facilitate the production of programming tape, the automatic duplication of the tape, and provide a readout unit of maximum reliability.

Another object on the invention is to provide an improved tape punching unit which includes an automatic duplicating section.

A further object of the invention is to provide an improved tape readout unit which has novel electrical contacts to provide maximum reliability.

A still further object of the invention is to provide an improved tape punching system which is of minimum size, one section of which permits the original manual production of a program tape and another section of which provides a duplication of the original tape, a high quality readout unit utilizing a perforated tape for operating any equipment connected thereto.

A better understanding of this invention may be had from the following detailed description when read in connection with the accompanying drawings, in which.

Figure 7:
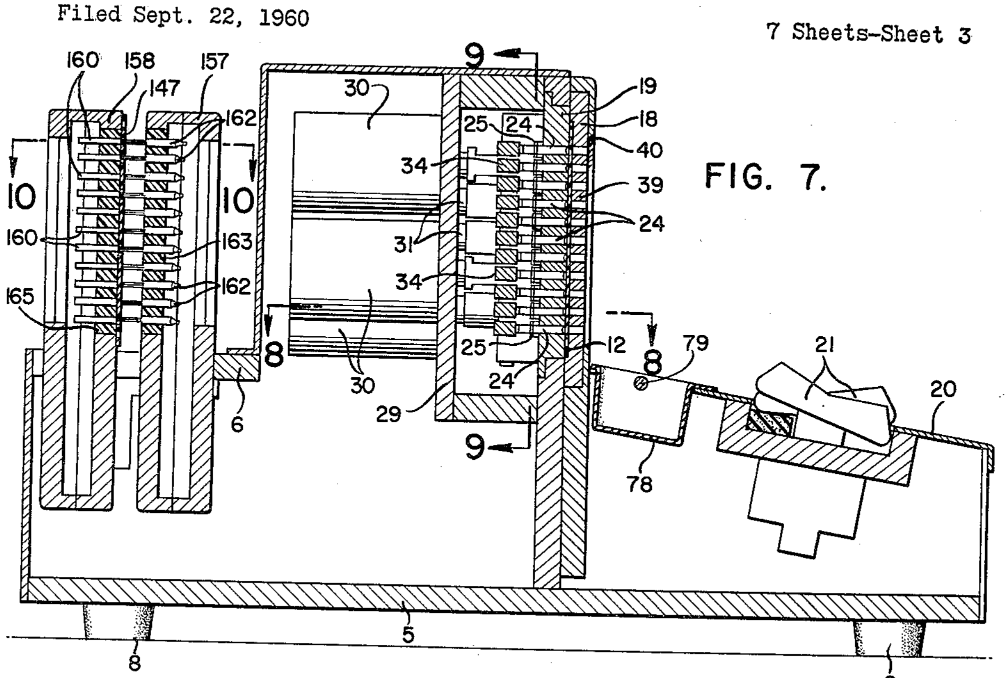
FIG. 7 is a cross-sectional view of the punch and duplicating elements and taken along the line 7—7 of FIG. 1.

Referring, now, to the drawings, the manual punching and duplicating unit shown in FIGS. 1 to 14, inclusive, will first be described. This unit is mounted in a casing having a bottom plate 5, a top plate 6, end plates 7, and feet 8. The punch portion or section of the unit shown in FIGS. 1 to 14, inclusive, includes a supply reel 9 and a takeup reel 10. A Mylar or similar type of tape, shown at 12, passes from reel 9 to reel 10, over aligning roller 17 and guide sprockets 14 and 15, when driven by sprocket 16, the tape passing between a die plate 18 and a punch alignment plate 19 (see FIG. 7). The tape has two rows of prepunched sprocket holes 11 and 13 which pass over the teeth of the guide sprockets 14 and 15 and the teeth of drive sprocket 16. There is provided within a frame indicated by the bit array bracket, provision for ten rows of functional perforations, as numbered, and one master row of perforations positioned transversely of the tape, one frame of twelve perforations in length longitudinally of the tape thus providing 132 information bits within a frame.

On a sloping console plate 20 are eleven pivoted keys, ten of which are functional keys 21, and one of which, 22, is a master key. On this panel is shown a lift bar 79 for removing a tray 78 which collects the punched-out material. A toggle switch 80 is provided for shifting the perforating portion of the unit from manual to automatic operation, and vice versa, an off position being between the two extreme positions. Also positioned on the panel is a punch key or switch 82, these elements being shown in the circuit diagram of FIG. 12. On the face of the panel is a special counter 83, which counts both the number of vertical rows of perforations up to 12 and then shifts to frame indications.

Figure 8:
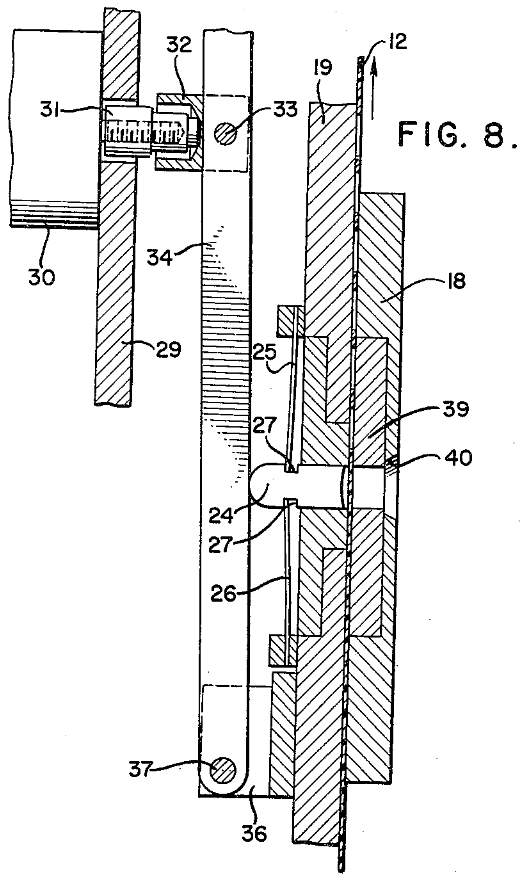
FIG. 8 is a cross-sectional view of one of the punch units taken along the line 8—8 of FIG. 7.
Figure 10:
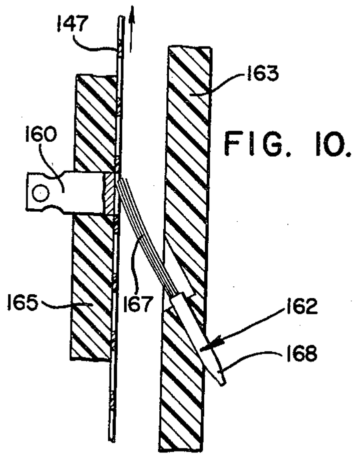
FIG. 10 is a detail view of the duplicating contact elements taken along the line 10—10 of FIG. 7.
Figure 11:
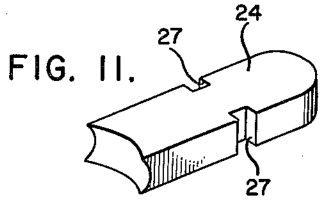
FIG. 11 is a perspective view of a punch element embodied in the invention.
Figure 9:
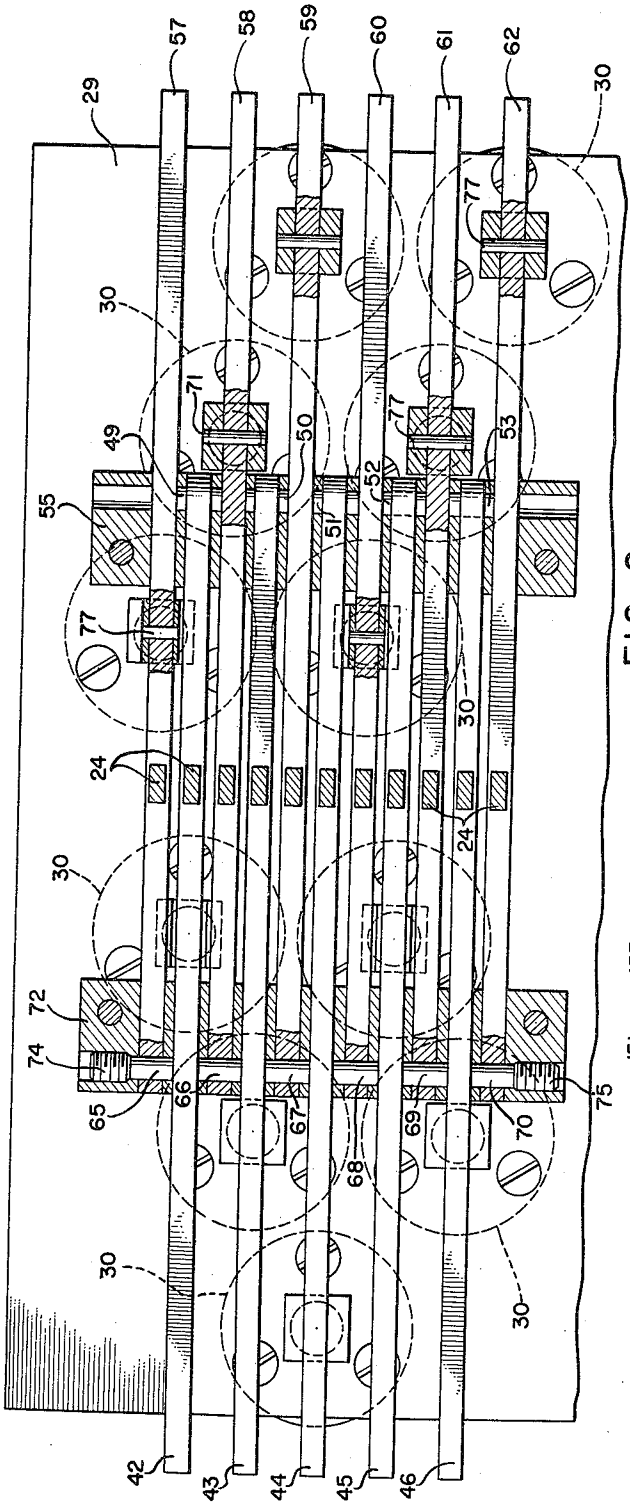
FIG. 9 is an elevational view of the punch elements on enlarged scale and taken along the line 9—9 of FIG. 7.

The details of the punch mechanism are illustrated in FIGS. 8 and 9, and show eleven punches 24, each of which is as shown in FIG. 11, each punch being mounted on leaf springs such as shown at 25 and 26 positioned in notches 27 of the punch 24. The eleven punches 24 are operated by eleven solenoids, as shown by the dotted lines 30 in FIG. 9, and in full lines in FIGS. 7 and 8.

Figure 2:
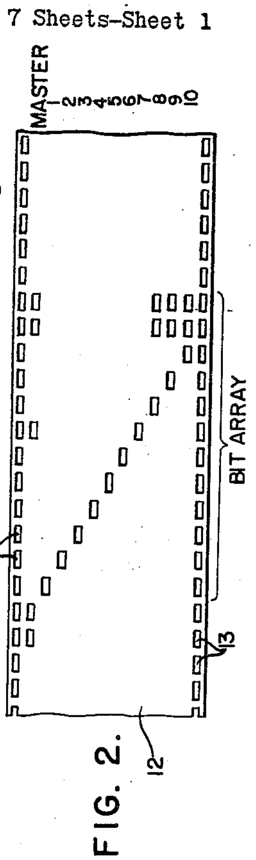
FIG. 2 is a plan view of a section of perforated tape showing one frame having certain information bits.

In FIG. 8, a solenoid 30 moves its armature 31 and coupling 32 to the right, the coupling being pivoted at 33 to a punch arm 34, one end of the arm being pivoted to the bracket 36 at 37. The solenoids are mounted on a plate 29. The springs 25 and 26 normally hold the rounded end of the punch against the arm 34, but when the solenoid is energized, the cutting end of the punch is brought in contact with the tape 12 and punches a rectangular perforation as shown in FIG. 2, the punched-out portion passing through an opening in a die 39 and an opening 40 in the die plate 18 to be collected by the tray 78.

As shown in FIG. 9, the punch-actuating arms corresponding to arm 34 (FIG. 8) are staggered, the ends of five arms 42 to 46, inclusive, being pivoted on rods 49 to 53, inclusive, in mounting block 55. Six other punch-operating arms 57 to 62, inclusive, are pivoted on rods 65 to 70, inclusive, in a mounting block 72. The end pivoting rods 65 and 70 are held in position by set screws 74 and 75, respectively, these screws being unnecessary for the pivoting rods 49 to 53 as the latter are held in position by the outer punch-operating arms 57 to 62. By staggering the operating arms just described, the solenoids 30 may also be staggered, permitting these elements to be positioned in a minimum of space. The pivot pins corresponding to pin 33 in FIG. 8 for the solenoid operating punch arms 57 to 62, inclusive, are shown at 77 in FIG. 9.

Figure 3:
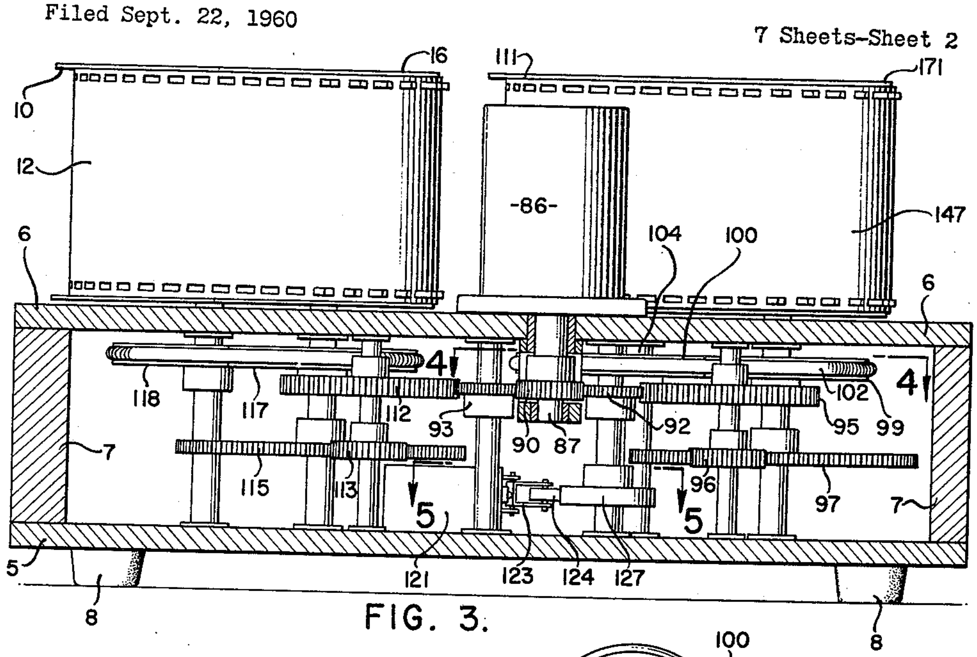
FIG. 3 is a partial cross-sectional view of the unit shown in FIG. 1 and taken along the line 3—3 of FIG. 1.

Referring, now, to the drive for the reel 10 and sprocket 16, reference is made to FIGS. 3, 4, 5, and 6. FIG. 3 is an end view, showing not only the drive for sprocket 1 and reel 10 but also a drive for reel 111 and sprocket 171, which is the takeup reel and drive sprocket, respectively, for punched tape 147 which is to be automatically duplicated. Both sprockets 16 and 171 and reels 10 and 111 are driven by a motor 86 having a shaft 87 mounted in a bearing in the plate 6. Mounted on the shaft 87 is a gear 90 in mesh with gears 92 and 93. The gear 92 is in mesh with a large gear 95 which drive a smaller gear 96 in mesh with a large gear 97. On the shaft of gear 97 is a pulley 99 which drives another plley 100 through a spring belt 102. The pulley 100 is mounted on a shaft 104 for the reel 111. Mounted on the shaft of gear 97 is the tape-advancing sprocket 171 for tape 147.

Figures 4, 5, 6:
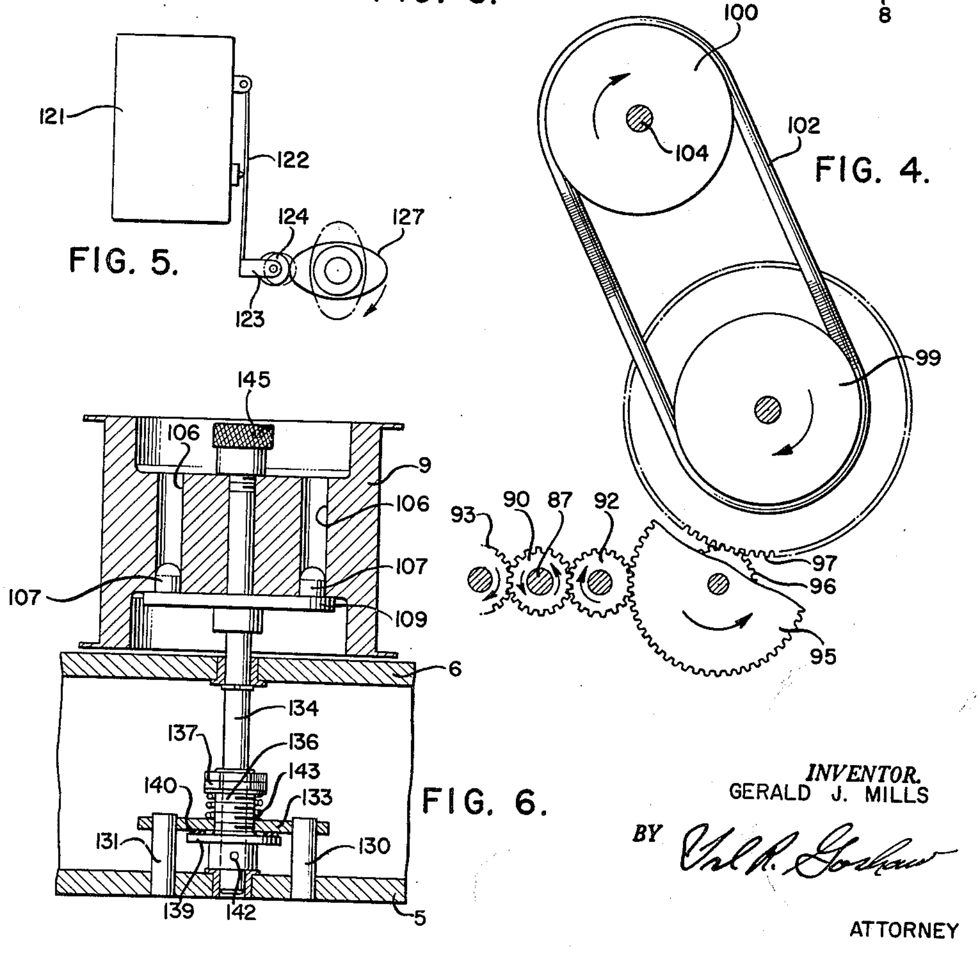
FIG. 4 is a detail view of the reel drive taken along the line 4—4 of FIG. 3.
FIG. 5 is a detail view of the frame-advancing microswitch and taken along the line 5—5 of FIG. 3.
FIG. 6 is a cross-sectional view of the feed reel taken along the line 6—6 of FIG. 1.
Figure 12:
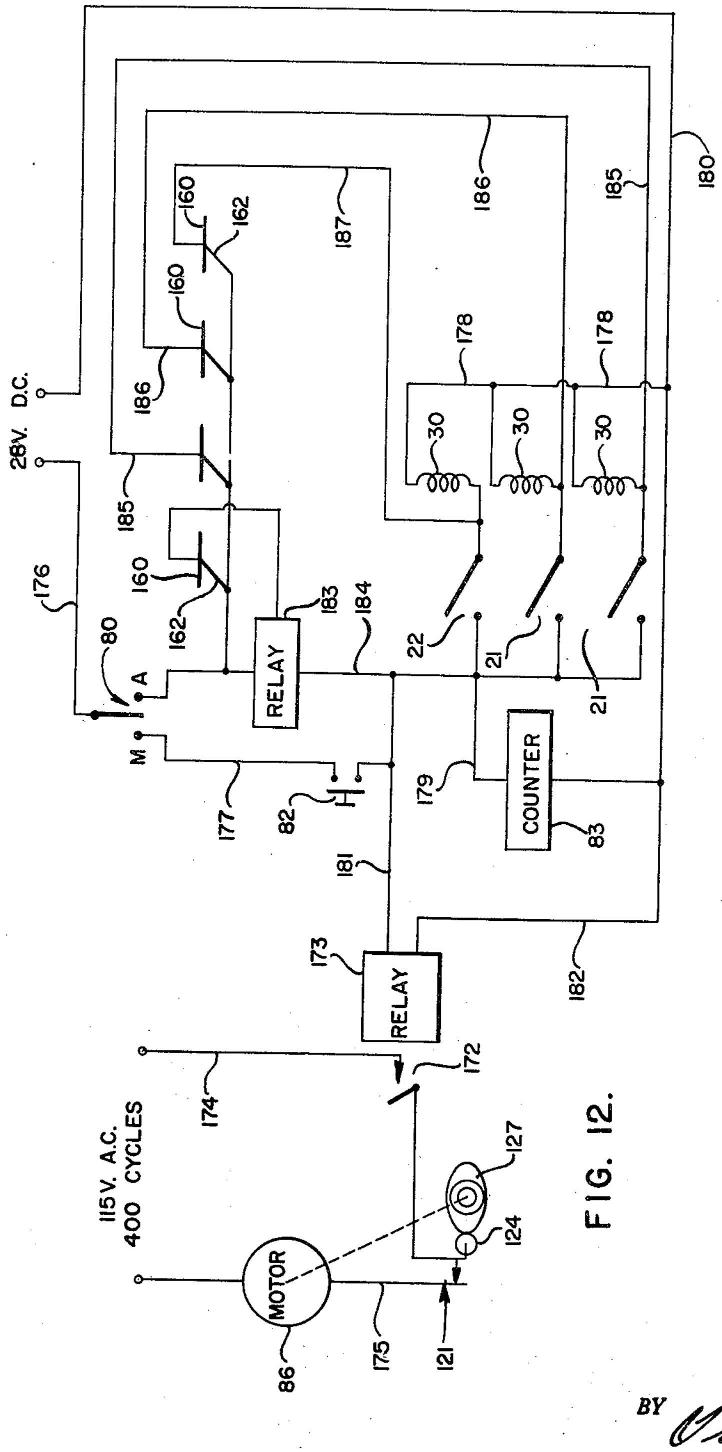
FIG. 12 is a diagrammatic view of the fundamental circuit employed in the manual and duplicating unit of the invention.

The reel 10 is driven through a similar group of gears 93, 112, 113, 115, pulley 117 and pulley 118. Drive sprocket 16 is mounted on the shaft of gear 115 for advancing tape 12. Also shown in FIGS. 3 and 5 is a high ratio switch 121 having an actuating lever 122 and a yoke 123 in which is a roller 124. The roller 124 rides on an elliptical cam 127 mounted on the shaft of gear 92 so that in a 180 degree rotation of the cam, the switch is opened and closed to advance the tape 12, or both tapes 12 and 147. These elements are shown in FIG. 12 as connecting and disconnecting the power from the motor 86, as will be explained hereinafter.

The supply reel 9 for the perforator and a supply reel 128 for the punched tape are held back by spring-loaded clutches as shown in FIG. 6. In this figure showing reel 9, the mechanism for the other reel 128 being the same, two pins 130 and 131, fixedly mounted in the plate 5, carry a friction plate 133. Mounted on a shaft 134 is a threaded cylinder 136 having a nut 137 threaded thereon, the other end of the cylinder carrying a plate 139 on which is a friction ring 140. The cylinder 136 is pinned to the shaft 134 at 142. Abutting the nut 137 and the fixed plate 133 is a compression spring 143.

Since reels 9 and 128 are supply reels, a drag is exerted on the tape as it is withdrawn from the reels by the friction between the fixed plate 133 and the rotatable friction ring 140 caused by the tension in the spring 143 which is adjustable by the nut 137. The reel 9 is shown with a thumb nut 145 threaded on the shaft 134 for holding the reel on the shaft. The reel 9 is positioned on plate 109 and driven by pins 107 in holes 106.

Figure 14:
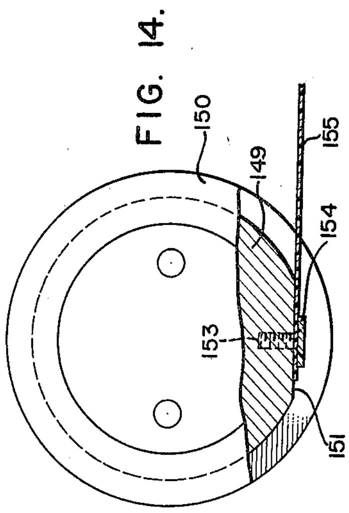
FIG. 14 is a view, partly in cross-section, of the tape attachment to the reel and taken along the line 14—14 of FIG. 13.
Figure 13:
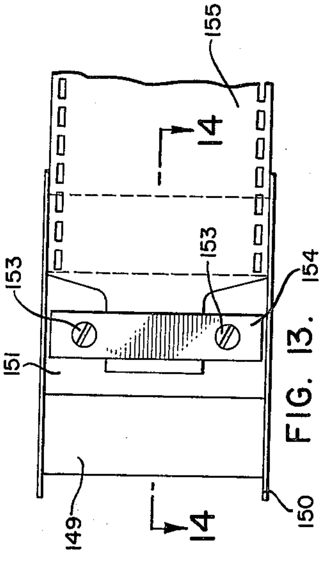
FIG. 13 is a detail view of a reel showing the attachment of the tape thereto.

Referring, now, to FIGS. 13 and 14, the tape 12 in the perforator and the tape 147 in the duplicating reader are mounted on their respective reels, as shown in FIGS. 13 and 14. The hub 149 of a reel 150 has a flat portion 151 on which is fastened, such as by screws 153, a bar 154, the end of a tape 155 being placed between the bar 154 and the flat surface 151, the bar then being tightened by the screws 153.

Referring, now, to the reading-out portion of the duplicator unit, the tape 147 is shown passing between an eleven brush contact holder plate 157 and a contact plate 158 for eleven fixed electrical contacts 160. The brush contactors 162 are mounted in an insulation block 163, the electrical contactors 160 being mounted in an insulation block 165. As shown in detail in FIG. 10, the brush contactors 162 are formed of a plurality of wires 167 and mounted in a tubular socket 168. As shown by the arrow, the film is travelling at an angle to the wires 167 and thus there will always be at least one wire making contact with the contactors 160 whenever a perforation is encountered by a brush. The reading-out portion of the duplicator has an aligning roller 169, a guide sprocket 170 and drive sprocket 171 for properly aligning and advancing the tape 147 past the brush contactors 162 and the fixed electrical contactors 160.

Figure 1:
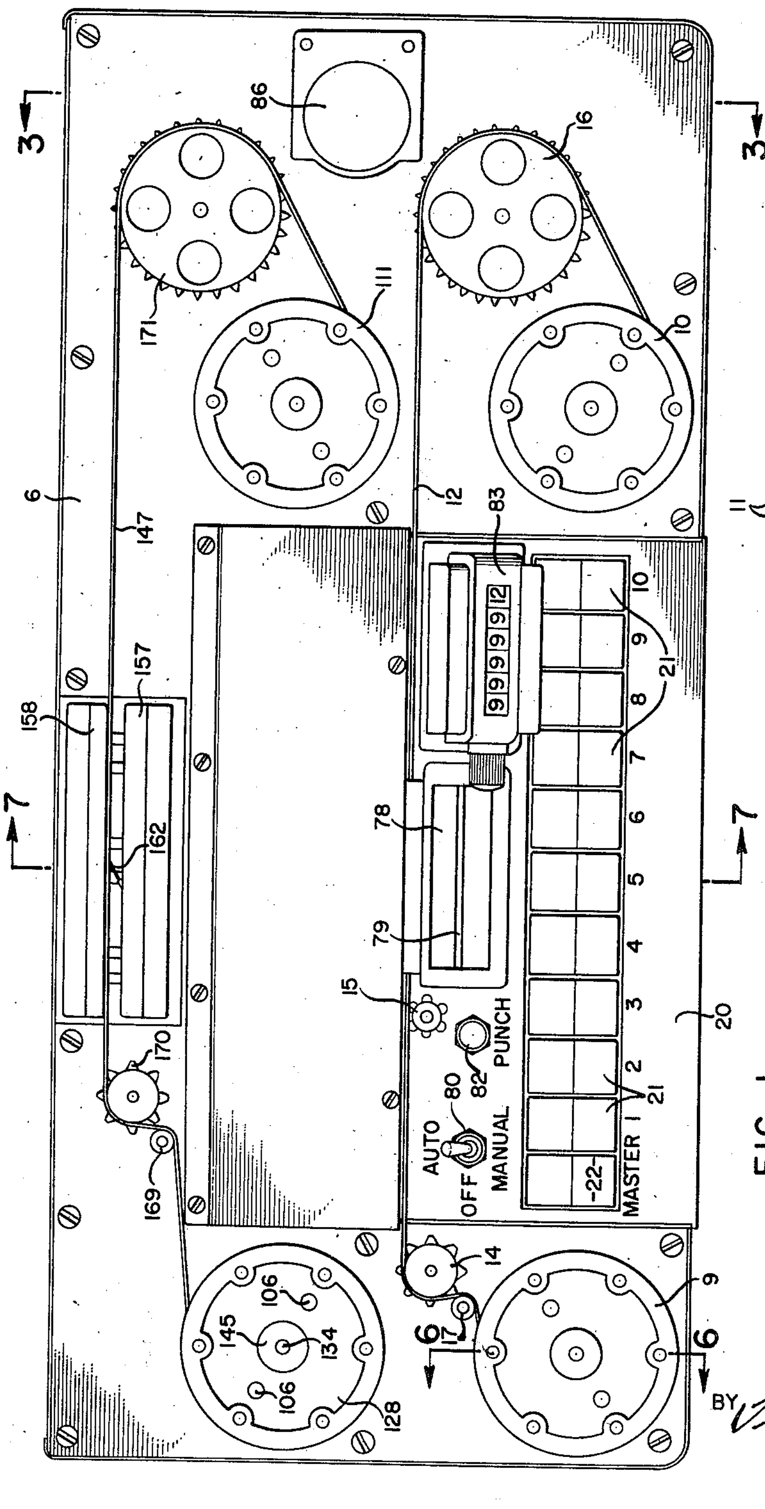
FIG. 1 is a plan view of the combination manual and duplicating unit embodying the invention.

Referring, now, to the operation of the unit shown in FIG. 1, and particularly to the manual perforating portion thereof shown in the lower portion of the figure, reference is made to the diagram shown in FIG. 12, it being understood that relays are used wherever delays are required. The motor 86 moves the tape one perforation longitudinally of the tape upon closing of contact 172 of relay 173, the energizing circuit being through switch 121 from a 115-volt 400-cycle source over conductors 174 and 175. The motor 86 is de-energized when cam 127 rotates 90 degrees, but will continue to be rotated by the motor until it again closes switch 121 during which contact 172 is broken. When the tape has stopped and switch 80 is in manual position M, any one of keys 21 and 22 may be actuated, only three of the eleven being shown for the sake of clarity, to set up any desired program for a vertical row of perforations. When this is accomplished, punch key 82 is pressed and the solenoids 30 connected to activated keys 21 and 22 are energized from a power source such as 28 volts direct current. This circuit is over conductors 176, 177, and 178. The tape 12 is thus punched as explained above. Simultaneously, the counter 83 is actuated over conductors 179 and 180 to indicate one perforation advancement of the tape. Also, the relay 173 is energized to close the contacts 172 to advance the tape to the next perforation position, this circuit being over conductors 181 and 182. Should no punching be desired at any position, the punch key 82 will still energize relay 173 to move the tape, and the movement will be counted by counter 83.

If it is now desired to duplicate or copy a punched tape, the punched tape is placed in the upper portion of the unit shown in FIG. 1, such as tape 147, and the switch 80 thrown to automatic operation position A. In this event, the brush contacts 162 now control the energization of respective solenoids 30, only four of the eleven brushes being shown for the sake of clarity. A slow-to-make relay 183 may now replace the punch key 82, although a punch key could be used at 183. The relay may be actuated by one of the master row of perforations. The energizing circuits for the solenoids 30, relay 173 and counter 83 are now over conductors 184, 185, 186, 187, and the other conductors previously traced.

It is realized that any desired number of duplicate copies of the original tape may be made by repeating the automatic operation as just described.

Figures 15, 16, 17:
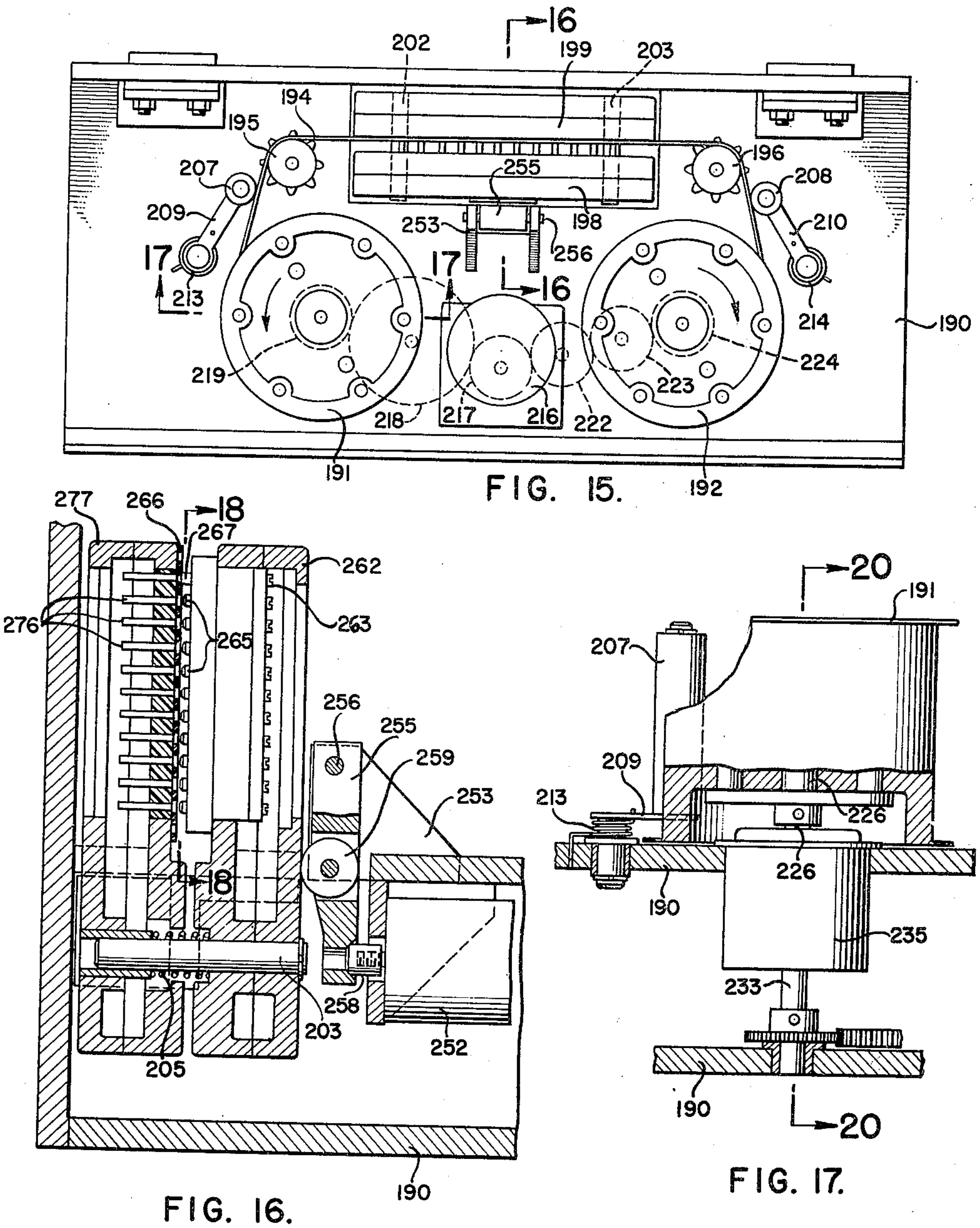
FIG. 15 is a plan view of the readout unit of the invention.
FIG. 16 is a cross-sectional view of the electrical contact portion of the readout unit and taken along the line 16—16 of FIG. 15.
FIG. 17 is a detail view of the tape reel drive taken along the line 17—17 of FIG. 15.
Figure 20:
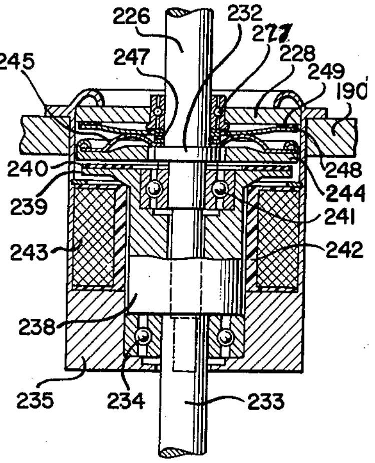
FIG. 20 is a cross-sectional view of the reversible reel drive and taken along the line 20—20 of FIG. 17.

Referring, now, to the remaining figures of the drawings, a separate reader unit is shown in which a casing 190 has mounted thereon tape reels 191 and 192, these reels being driven through special clutches such as shown in FIGS. 17 and 20 and to be described hereinafter. Since this is a readout unit, a perforated tape 194 is shown between the reels 191 and 192 over guide sprockets 195 and 196 and between a movable contact block 198 and a fixed contact block 199, these blocks being mounted on pins 202 and 203, the blocks 198 and 199 being urged apart by compression springs on the pins 202 and 203, such as shown at 205 in FIG. 16. The tape 194 is held taut by idler rollers 207 and 208 mounted on arms 209 and 210, respectively, and under the bias of respective springs 213 and 214. The rollers 207 and 208 are gold-plated to bleed off any static generated by the moving tape.

A substantially instant-starting type of unidirectional motor 216 rotates reel 191 through gears 217, 218 and 219, and rotates reel 192 through gears 217, 222, 223 and 224, it being noted that there are four gears between the motor and reel 192 and only three gears between the motor and reel 191. Thus, rotation of the motor 216 will rotate gear 219 as shown by the arrow, while gear 224 will be simultaneously rotated in the opposite direction, as shown by the arrow. This gear drive mechanism and the clutches shown in FIGS. 17 and 20 permits the reversing of the tape at any time by the alternate energizing of the magnetic clutches shown in FIGS. 17 and 20, which will now be described.

As shown in these last-mentioned figures, each reel is fixedly mounted on a shaft such as 226, which, in turn, is mounted in a bearing 227 in a friction plate 228. The shaft 226 has a collar 232 thereon and is tapered and extends into a shaft 233 so that the shaft 226 is rotatable within shaft 233, the shaft 233 being rotatable in a bearing 234 in a housing 235. A cylindrical portion 238 of the shaft 233 and on a bearing 241 has a flange 239 on which is mounted a friction ring 240. Surrounding the member 238 is an electrical coil 243 within an annular insulator cup 242. Facing the friction ring 240 is a disc plate 244 which is held in position by a spider spring 245 having its outer ends under the rolled-over rim of plate 244, the inner ends resting between the collar 232 and spacers 247. Also between the spacers 247 and bearing 227 are the inner ends of a spring 248, the outer portion of which carries a friction ring 249. To drive the reel 191 as a takeup reel when the shaft 233 is turning in the proper direction to take up film on the reel, the winding 243 is energized. Upon energization, the plate 244 is pulled into contact with the friction ring 240 to provide sufficient friction to drive the reel and provide sufficient slippage to accommodate variations in the diameter of the roll of tape on the reel. At the same time, the spider spring 248 removes the friction ring 249 from the plate 228.

Now, upon de-energization of the winding 243, the plate 244 is released from the friction ring 240 by action of the spider spring, and the friction ring 249 is brought in contact with the plate 228. Although the shaft 233 is turning in the same direction, it is not now connected to the shaft 226, while the shaft 226 and the reel, which is now serving as a supply reel, will provide holdback friction created between the plate 228 and the friction ring 249. Thus, the motor 16 may continue to run in the same direction at all times and to obtain reverse directional transport of the tape, it is only necessary to reverse the energization of the windings 243 on the magnetic clutches as above described. This type of drive permits a sustained high-speed readout.

Figure 22:
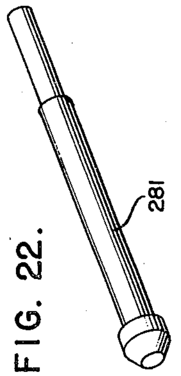
FIG. 22 is a perspective view of a modification of the readout contact element shown in FIG. 21.
Figure 21:
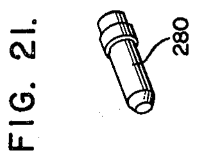
FIG. 21 is a perspective view of one type of readout contact element embodied in the invention.

Since reliability is the controlling and most important factor of program apparatus, there should be no fall-out or loss of contact when contact should be made. That is, when a perforation passes between two electrical contact members, contact should always be assured. The readout mechanism of this unit provides maximum reliability in this respect by the use of novel contact members and the manner in which contact is accomplished between two contact elements. Two basic types of contacts are shown at 280, 281 and 284 in FIGS. 21, 22 and 23, respectively, contactors 280 and 281 functioning in the same manner.

Figure 24:
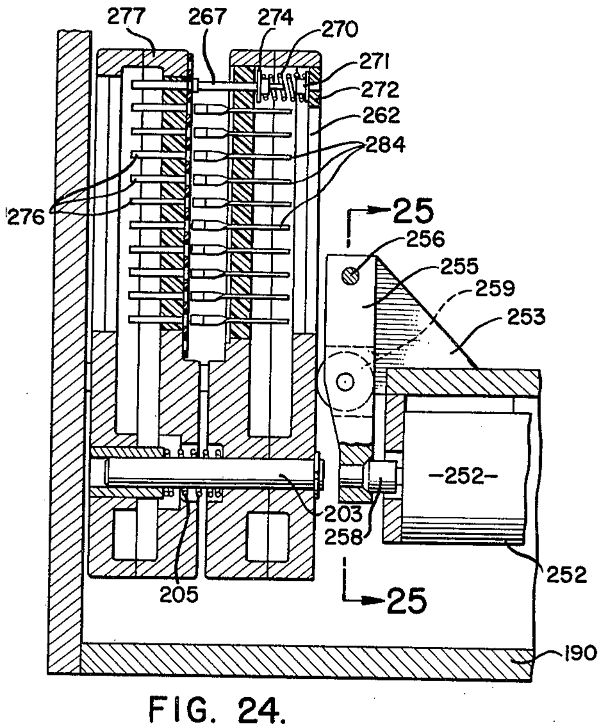
FIG. 24 shows a modification of the unit shown in FIG. 16.
Figure 25:
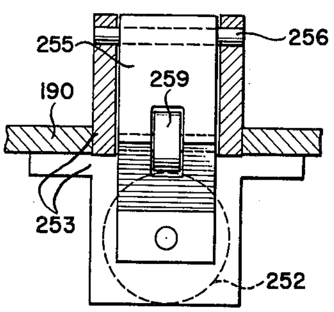
FIG. 25 is a detail view of the headshift solenoid taken along the line 25—25 of FIG. 24.
Figure 19:
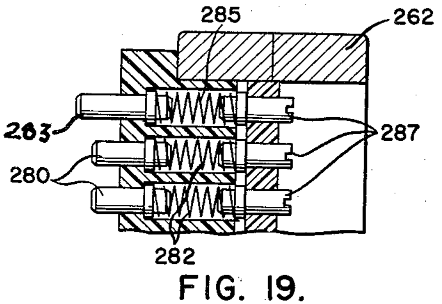
FIG. 19 is a detail view of the control contacts and the readout contacts taken along the line 19—19 of FIG. 18.

Referring, now, to FIG. 16 showing the general contact system with one type of contactor, a solenoid 252 is mounted on a bracket 253. An arm 255 pivoted at 256 is actuated by the armature of the solenoid through a coupler 258. Intermediate the pivot 256 and coupler 258 is a roller 259 which is adapted to be moved to the left (see FIGS. 16 and 24) upon energization of the solenoid. Mounted in a housing 262 is a plurality of contactors 263 having tapered ends 265. These contactors may be in the form shown in FIG. 21 or in FIG. 22, the shorter contactors requiring less space. The top contactor, as shown in FIG. 16, is longer than the other ten contactors so that the end thereof may continuously ride on the tape, as shown at 266. This is the master or control contractor which controls the advancement of the tape one or more frames or reverses it according to the programming. The master contactor shown at 267 is spring mounted as shown in FIGS. 19 and 24, a compression spring 270 being positioned between a stud 271 insulted from the block 262 by insulation 272. The other end of the spring abuts the flange of a collar 274. This master control contactor is the same in all modifications, the end of which rides on the film at all times.

Figure 18:
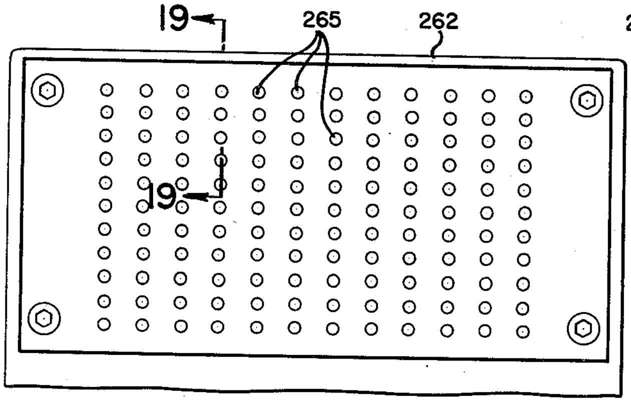
FIG. 18 is an elevational view of the contact elements taken along the line 18—18 of FIG. 16.

The fixed contact elements which are shown at 276 are in the form a eyelets so that as the tapered pins are moved into contact with the eyelets, there is a wiping and cleaning action provided. To prevent any collection of dirt or tape surface material on the pins, the functional 120 pins are maintained away from the travelling tape at all times. However, when the solenoid 252 is energized, the mounting block 262 is moved toward fixed block 277, and wherever a perforation is encountered, the pin ends 265 pass through the perforations and contact the eyelets of contactors 276. Upon deenergization of solenoid 252, the springs 205 move the mounting block 262 back to the position shown in FIGS. 16 and 24. The movable contactors 263 may be in the form shown in FIG. 21 at 280 or of the form shown in FIG. 22 at 281, FIG. 19 showing the assembly of the pins 280 in the movable block 262 with their biasing springs 282, the master pin 283 having a spring 285. The ends of the springs 282 and 285 are mounted on studs 287. FIG. 18 shows the pin arrangement as having eleven rows transversely of the tape and twelve rows longitudinally of the tape to detect up to 132 bits of information.

Figure 23:
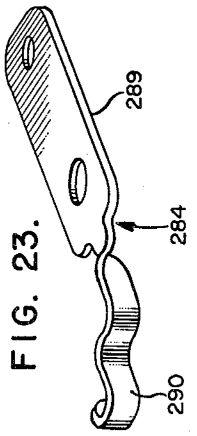
FIG. 23 is a perspective view of another modification of a readout contact element.

FIG. 23 shows another reliable wiper type of contact, this wiper 284 being shown assembled in FIG. 24 for the 120 functional contacts, only ten being shown in FIG. 24. These contractors have flat mounting portions 289 and S shaped resilient contact portions 290. The contact portions 290 are at an angle to the direction of travel of the tape. As mentioned above, the master contactor 267 may be the same as shown in FIG. 16, but in this instance, the fixed contact elements for the functional contactors have flat surfaces. When the movable block 262 is moving toward the fixed block 277, the ends of the resilient portions 290 of the contactors 284 will wipe over the flat surfaces of contactors 276. Thus, a cleaning action of the contact surfaces is provided. Even though the tape is at certain times interposed between contactors, nevertheless, there will still be a wiping action keeping the ends of the contactors 284 clean.

In operating the readout unit, the master row of perforations as shown in FIG. 2 may be punched to form groups of two or more to control the magnetic clutches for reversing the tape, to count frames, to control the solenoid 252 or stop the tape at any desired point, forward or reverse. The functional contacts are connected to external electrical circuits to perform test operation sequences or perform any series of operations in a particular order. By the use of novel self-cleaning contactors and the avoidance of contact contamination by avoiding sliding contact with the tape, a particularly reliable programmer is provided.

I claim:

1. Tape readout apparatus comprising means for advancing a perforated tape intermittently and in either direction, a plurality of fixedly mounted electrical contact elements, a plurality of simultaneously movable electrical contact elements, said tape being advanced between said pluralities of elements, one of said movable contact elements having one end thereof in constant contact with said tape for automatically controlling the simultaneous movement of said movable electrical contacts and for reversing the direction of movement of said tape, the ends of the other of said movable contact elements being positioned adjacent and out of contact with said tape during movement thereof, and means for moving all of said other movable contact elements toward said tape, the ends of said movable contact elements opposite perforations in said tape contacting said fixed contact elements opposite said perforations.

2. Tape readout apparatus in accordance with claim 1 in which the ends of said other movable contact elements are tapered and said fixed contact elements are annular eyelets into which said tapered ends of said other contact elements are adapted to pass to make electrical contacts.

3. Tape readout apparatus in accordance with claim 1 in which said movable contact elements are spring loaded, the ends of said elements being adapted to slide over said fixed contact elements when a perforation is between said fixed and movable contact elements and said other movable contact elements are moved toward said tape.

4. Tape readout apparatus in accordance with claim 1 in which reels are provided for said tape together with means for continuously applying a driving torque to said reels in opposite directions and individual means for each reel for alternately increasing the torque being applied to said reels, said individual means being under control of said one movable contact.

5. In a system for making electrical contacts at previously punched control and operational perforations in a tape, a pair of reels for said tape, means for advancing said tape, a fixed plate having fixed electrical contacts therein, a movable plate having electrical contacts opposite said fixed contacts, said tape passing between said fixed and movable plates, and means for intermittently moving said movable contacts into contact with said fixed contacts when perforations in said tape are interposed between said movable contacts and fixed contacts, one of said contacts controlling the movement and direction of movement of said tape and the movement of said movable contacts into contact with said fixed contacts.

6. A system in accordance with claim 5 in which said movable contacts have tapered ends and said fixed contacts are eyelets to provide a wiping action between said contacts when brought together.

7. A system in accordance with claim 5 in which said movable plate contacts are spring loaded members having ends permitting the movement of said tape in either direction.

8. A system in accordance with claim 5 in which a motor is provided for continuously applying a driving torque to the shafts of said reels in opposite directions, each reel being provided with a magnetic clutch for alternately increasing the driving torque on a selected one of the shafts of said reels for reversing the direction of transport of said tape.

9. A system in accordance with claim 8 in which each of said magnetic clutches includes two pairs of friction units and a solenoid, the energization of said solenoid actuating one of said pairs of units into contact and disengaging the other of said pairs, de-energization of said solenoid reversing the actuation of said units.

10. In a system for making electrical contacts at previously punched perforations in a tape, the combination of means for advancing said tape intermittently and in either direction, a plurality of fixedly mounted electrical contact elements, a plurality of simultaneously movable electrical contact elements, said tape being advanced between said pluralities of elements, the ends of said pluralities of contact elements being positioned adjacent and out of contact with said tape during the movement thereof by said tape-advancing means, and means for moving all of said movable contact elements toward said tape when said tape is stationary, the ends of said movable contact elements opposite perforations in said tape contacting said fixed contact elements opposite said perforations.

11. A system in accordance with claim 10 in which said plurality of movable contact elements have tapered ends and said plurality of fixedly mounted contact elements have openings with surfaces along with said tapered ends slide.

12. A system in accordance with claim 10 in which said plurality of movable contact elements are spring loaded with tapered ends and said plurality of fixedly mounted contact elements have surfaces along which said tapered ends slide.

References Cited in the file of this patent

UNITED STATES PATENTS

| | | |
|---|---|---|
| 1,298,400 | Reynolds | Mar. 25, 1919 |
| 2,055,031 | Hutchings | Sept. 22, 1936 |
| 2,217,209 | Von Pein et al. | Oct. 8, 1940 |
| 2,377,801 | Mills et al. | June 5, 1945 |
| 2,436,126 | Tholstrup | Feb. 17, 1948 |
| 2,514,031 | Daly | July 4, 1950 |
| 2,945,538 | Little et al. | July 19, 1960 |
| 2,971,692 | Hetherington et al. | Feb. 14, 1961 |